(12) United States Patent
Umapathy

(10) Patent No.: US 10,565,293 B2
(45) Date of Patent: Feb. 18, 2020

(54) SYNCHRONIZING DOM ELEMENT REFERENCES

(71) Applicant: Adobe Inc., San Jose, CA (US)

(72) Inventor: Thangaraj Umapathy, Bangalore (IN)

(73) Assignee: Adobe Inc., San Jose, CA (US)

( * ) Notice: Subject to any disclaimer, the term of this patent is extended or adjusted under 35 U.S.C. 154(b) by 203 days.

(21) Appl. No.: 14/468,896

(22) Filed: Aug. 26, 2014

(65) Prior Publication Data
US 2016/0062963 A1    Mar. 3, 2016

(51) Int. Cl.
G06F 17/00    (2019.01)
G06F 17/22    (2006.01)
G06F 17/24    (2006.01)

(52) U.S. Cl.
CPC .......... *G06F 17/2247* (2013.01); *G06F 17/24* (2013.01); *G06F 17/227* (2013.01)

(58) Field of Classification Search
CPC .......... G06F 17/227; G06F 17/00; G06F 9/45; G06F 17/2247; G06F 17/24
USPC .............................................. 715/234; 726/4
See application file for complete search history.

(56) References Cited

U.S. PATENT DOCUMENTS

| | | | | |
|---|---|---|---|---|
| 6,829,746 B1 * | 12/2004 | Schwerdtfeger | .... | G06F 17/2247 715/239 |
| 7,031,956 B1 * | 4/2006 | Lee | ........................ | G06F 16/284 |
| 7,401,289 B2 * | 7/2008 | Lachhwani | ........... | G06F 17/212 715/243 |
| 7,580,953 B2 * | 8/2009 | McCauley | ........ | G06F 17/30011 |
| 7,996,204 B2 * | 8/2011 | Oslake | ................ | G06F 11/3414 703/13 |
| 8,510,647 B2 * | 8/2013 | Madden | .................... | G06F 8/75 715/236 |
| 8,713,438 B1 * | 4/2014 | Broniek | ................ | G06F 17/241 715/715 |
| 9,213,777 B2 * | 12/2015 | Chan | .................... | G06F 17/3089 |
| 10,049,170 B1 * | 8/2018 | Long | .................... | G06F 16/9577 |
| 2002/0184264 A1 * | 12/2002 | Berg | ........................ | G06F 16/30 715/205 |
| 2004/0103373 A1 * | 5/2004 | Wei | ........................ | G06F 17/2247 715/234 |
| 2005/0022116 A1 * | 1/2005 | Bowman | ................ | G06F 16/986 715/234 |
| 2006/0123337 A1 * | 6/2006 | Koinuma | ................ | G06F 16/958 715/234 |

(Continued)

*Primary Examiner* — David Faber
(74) *Attorney, Agent, or Firm* — SBMC

(57) ABSTRACT

Techniques for synchronizing document object model (DOM) references between a host process and an edit process are described. In one or more implementations a page editor application is invoked to edit a mark-up language document. The page editor application may provide an editing user interface that provides access to both a DOM structure view and a "live" rendered view of the mark-up language document (e.g., a design view). In response to edits made to the mark-up language document via the user interface, elements affected by the edits are identified and temporary identifiers are assigned to the affected elements. The temporary identifiers are included when the edits are communicated to update the underlying DOM. The page editor application may employ the temporary identifiers to create new DOM identifiers for elements in relation to the DOM structure view and synchronize the identifiers between the DOM structure view and the rendered view.

20 Claims, 6 Drawing Sheets

(56) References Cited

U.S. PATENT DOCUMENTS

| | | | |
|---|---|---|---|
| 2006/0206890 A1* | 9/2006 | Shenfield | G06F 8/20 |
| | | | 717/174 |
| 2007/0198907 A1* | 8/2007 | Degala | G06F 17/2247 |
| | | | 715/205 |
| 2009/0006454 A1* | 1/2009 | Zarzar | G06F 17/2247 |
| 2010/0250706 A1* | 9/2010 | Burckart | H04L 67/02 |
| | | | 709/219 |
| 2010/0299364 A1* | 11/2010 | Baldwin | G06F 17/279 |
| | | | 707/797 |
| 2010/0318894 A1* | 12/2010 | Billharz | G06F 17/24 |
| | | | 715/234 |
| 2011/0302285 A1* | 12/2011 | D'Angelo | G06F 16/958 |
| | | | 709/222 |
| 2012/0324331 A1* | 12/2012 | Chartier | H04L 67/02 |
| | | | 715/234 |
| 2012/0331375 A1* | 12/2012 | Fanning | G06F 16/322 |
| | | | 715/234 |
| 2013/0073707 A1* | 3/2013 | Butler | H04L 67/38 |
| | | | 709/223 |
| 2013/0227397 A1* | 8/2013 | Tvorun | G06F 17/227 |
| | | | 715/235 |
| 2014/0129920 A1* | 5/2014 | Sheretov | G06F 17/2247 |
| | | | 715/234 |
| 2014/0157104 A1* | 6/2014 | Carlsen | G06F 16/958 |
| | | | 715/234 |

* cited by examiner

SYNCHRONIZING DOM ELEMENT REFERENCES

BACKGROUND

Individuals may interact with various computing resources, such as desktop applications or web applications available from service providers, to create and publish web development projects (e.g., mark-up language documents, web pages, web applications, web sites, etc.). Traditionally, text-based editors operated by sophisticated users having detailed knowledge of HTML and other programming languages were employed for web page development. Since text-based editing may be complicated and tedious, visual-based editors were developed in which users may create pages by laying-out elements in a "what you see is what you get (WYSIWYG) interface. The visual-based editors are designed to modify underlying documents for the web development project in response to manipulation of elements in the WYSIWYG view, and accordingly users are able to create projects visually without having detailed programming knowledge.

One challenge associated with visual-based editors is synchronization of references for elements between the visual editor and underlying code for the project. For example, elements of a page in a visual view may be organized differently in the visual view than in the underlying code structure for the page (e.g., the document object model (DOM) or other page representation). As such, it may be difficult to match elements created or modified in the visual view to elements constructed in the underlying code structure. An element-by-element tree comparison may be made following edits, but this approach may require significant processing time that interrupts the editing process. Additionally, if editing continues without proper synchronization of references, unintended edits may occur and changes may be lost. Thus, traditional web development tools may not fully satisfy users' needs and expectations in some editing scenarios.

SUMMARY

Techniques for synchronizing document object model (DOM) element references between a host process and an edit process are described herein. In one or more implementations a page editor application is invoked to edit a mark-up language document. The page editor application may provide an editing user interface that provides access to both a document object model (DOM) structure view and a "live" rendered view of the mark-up language document (e.g., a design view). In response to edits made to the mark-up language document via the user interface, elements affected by the edits are identified and temporary identifiers (temp IDs) are assigned to the affected elements. The temp IDs are included when the edits are communicated to update the underlying DOM. The page editor application may employ the temp IDs to create new document object model identifiers (DOM IDs) for elements and synchronize the identifiers between the DOM structure view and the rendered view.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
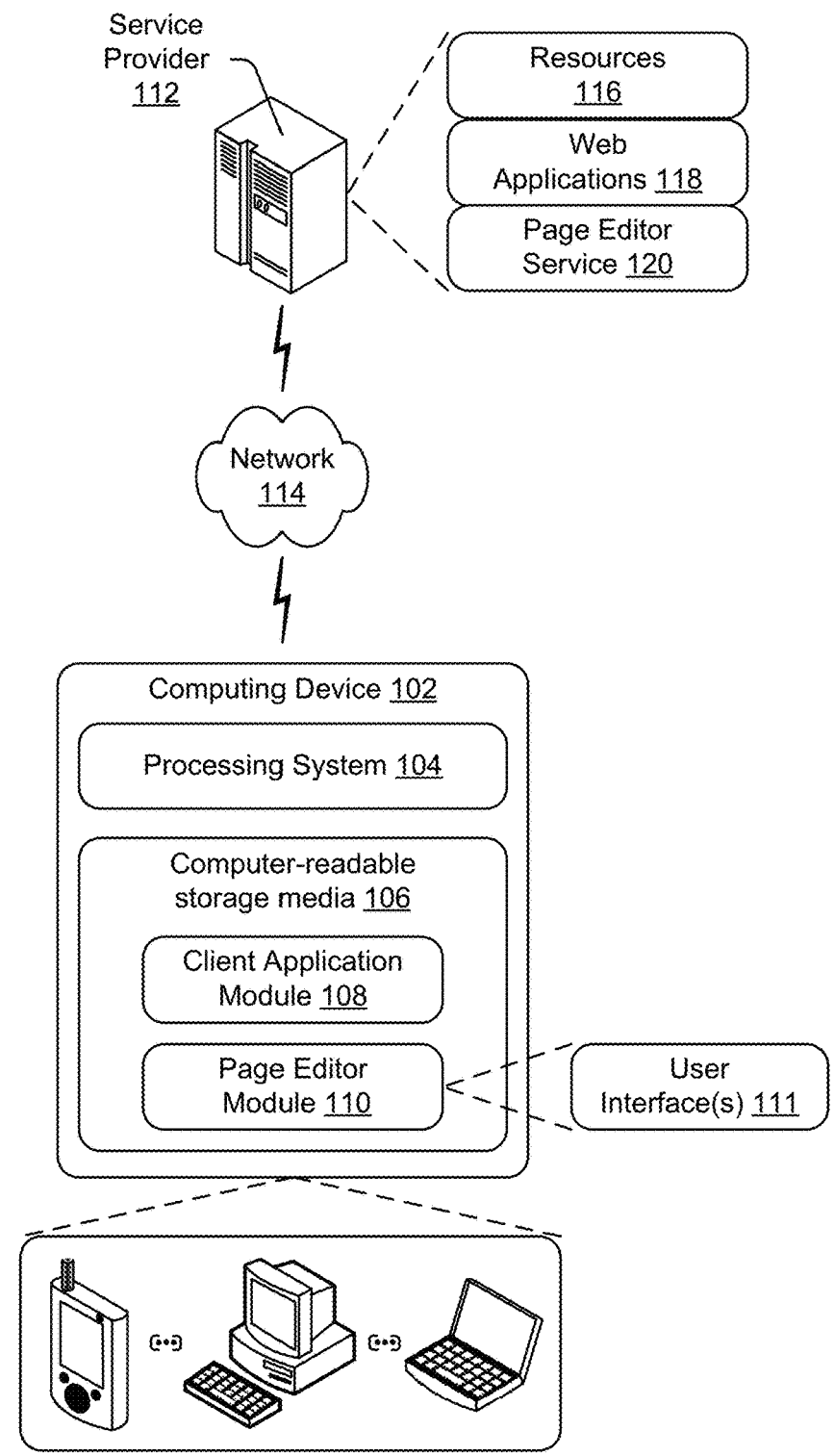
FIG. 1 is an illustration of an environment in an example implementation that is operable to employ techniques described herein.

One challenge associated with visual-based editors is synchronization of references for elements between the visual editor and underlying code for the project. For example, elements of a page in a visual view may be organized differently in the visual view than in the underlying code structure for the page (e.g., the document object model (DOM) or other page representation). As such, it may be difficult to match elements created or modified in the visual view to elements constructed in the underlying code structure.

Techniques for synchronizing document object model (DOM) element references between a host process and an edit process are described herein. As used herein the host process and edit process may refer to separate and distinct processor processes or threads that may be associated with corresponding software executed via a processing system of a device. For example, the host process may correspond to a page editor application employed to edit a mark-up language document and the edit process may correspond to a rendering application (e.g., a browser) used to provide a live view of the mark-up up language document. Examples of page editor applications that may be associated with a host process include but are not limited to Adobe™ Dreamweaver™, Microsoft™ Expression Studio, SeaMonkey™, and Google™ Web Designer. Examples of rendering applications that may be associated with an edit process include but are not limited to Internet Explorer™, Safari™, Chrome™, Firefox™, and an integrated browser incorporated with a page editor application.

In one or more implementations a page editor application is invoked to edit a mark-up language document. The page editor application is generally configured as any suitable web design and development application to facilitate creation and publishing of web development projects (e.g., mark-up language documents, web pages, web applications, web sites, etc.). The page editor application provides an editing user interface that provides access to both a document object model (DOM) structure view and a "live" rendered view of the mark-up language document (e.g., a design view), which may be provide via a host process and an edit process respectively as noted above. In response to edits made to the mark-up language document via the user interface, elements affected by the edits are identified and temporary identifiers (temp IDs) are assigned to the affected elements. The temp IDs are included when the edits are communicated to update the underlying DOM. The page editor application may employ the temp IDs to create new document object model identifiers (DOM IDs) for elements and synchronize the identifiers between the DOM structure view and the rendered view. For example, the temp IDs may be used as a mechanism to "synchronize" different IDs for elements that are employed in the host process and edit process. In one approach, synchronization as used herein involves mapping the temp IDs created in an edit process to IDs used for the DOM structure in the host process. A string, mapping file, table, or other suitable data structure indicative of the identifier mapping may then be returned for use by the edit process. The edit process may synchronize IDs by adopting the same IDs as used in the DOM structure or alternatively by using the mapping as a reference to ensure that elements are correctly referenced between the processes and operations are applied to elements as intended.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of page editor module 110 that represents functionality operable to implement techniques for DOM reference synchronization described above and below. The page editor module 110 may be configured as a web design and development application to facilitate creation and publishing of web development projects (e.g., mark-up language documents, web pages, web applications, web sites, etc.), one example of which is Adobe™ Dreamweaver™. Other web development suites, HTML editors, and design packages are also contemplated. In general, the page editor module 110 is configured to provide access to a variety of integrated tools for web development via one or more user interfaces 111 associated with the page editor. The page editor module 110 may provide both a visual "WYSIWYG" editor (e.g., a rendered view or "design" view) and a text-based code editor (e.g. a structure view,) in which a hierarchal representation of elements within pages may be viewed and manipulated. By way of example and not limitation, the document object model (DOM) structure for a page may be presented and edited via a structure view of the text-based code editor. Although DOM is referred to in various examples above and below, other hierarchal representations of elements are also contemplated such as various mark-up language, object-based, and script documents used to define the properties, behaviors, and structure of pages for a web development project. In one or more implementations, the rendered view and structure view may be associated with separate and distinct processes.

The page editor module 110 may provide features including but not limited to syntax highlighting, code completion, code collapsing, syntax checking and code hints. The rendered view or "design" view enables visual editing for page layout and automatic code generation without deep knowledge of programming languages and techniques. The rendered view may be provided via an integrated browser component. In addition or alternatively, browser extensions may be employed to preview content via other locally installed web browsers (e.g., Internet Explorer™, Chrome™, Firefox™, Safari™, etc.) within the user interface 111 of the page editor module 110 or via a separate window/user interface. Extensions may be provided as native extensions from a developer of the page editor module 110 or as third-party browser extensions. Additionally, the page editor module 110 is configured to support techniques for DOM reference synchronization, details and examples of which are discussed in relation to the following figures.

The page editor module 110 may be implemented as a software module, a hardware device, or using a combination of software, hardware, firmware, fixed logic circuitry, etc. The page editor module 110 may be implemented as a standalone component of the computing device 102 as illustrated. In addition or alternatively, the page editor module 110 may be configured as a component of the client application module 108, an operating system, or other device application. For example, the page editor module 110 may be provided as a plug-in or downloadable script for a browser. The page editor module 110 may also represent script contained in or otherwise accessible via a webpage, web application, a web-based service, or other resources made available by a service provider.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. As mentioned, web applications 118 may be operated over a network 114 using a browser or other client application module 108 to obtain and run client-side code for the web application. In at least some implementations, a runtime environment for execution of the web application 118 is provided by the browser (or other client application module 108). The runtime environment supports web applications 118 that may be written using dynamic scripting languages, such as JavaScript, hypertext markup language revision 5 and cascading style sheets (HTML5/CSS), and extensible application mark-up language (XAML). Script-based web applications may operate through corresponding runtime environments supported by a device that are configured to provide respective execution environments for corresponding applications. The runtime environments may provide a common set of features, routines, and functions for compatible applications thereby offloading coding of common tasks from application development. Thus, the runtime environment can facilitate portability of web applications to different kinds of systems and architectures with little or no change to the script for the applications. Various types of runtime environments may be employed including but not limited to JAVA™ runtime environment (JRE) and Adobe™ Flash™, to name a few examples.

The service provider is further illustrated as including a page editor service 120. The page editor service 120 is representative of a server-side functionality operable to support techniques for web project development including synchronization of DOM element references described herein. For example, the page editor service 120 may be configured to perform functionality that is described herein in relation to the page editor module 110 as a web-based service. In particular, the page editor service 120 may be configured to enable editing and reference synchronization as described above and below in connection with web applications 118 and client application modules 108 over the network 114. Moreover, the page editor service 120 may be configured to distribute page editor modules 110 for use by clients, such as by making the modules available for downloading over the network 114, communicating the modules to computing devices for use with client application modules 108, and so forth.

In operation, a page editor module 110 or client application module 108 may be executed to output a corresponding user interface 111 configured for interaction with one or more pages or documents. The page editor module 110 may be invoked to enable editing of the pages or documents via the user interface 111. In one approach, the page editor module 110 is associated with a host process configured to host an edit process associated with the client application module 108. The host process and edit process may be separate and distinct processes with respect to an operating system and processing system 104 of the device. In connection with edits, the page editor module 110 may assign temporary IDs to elements affected by the edits and utilize the temporary IDs to synchronize identifiers between the host process and edit process in the manner described herein. Comparable interactions may also occur using web applications 118 and services provided via a service provider 112 over the network 114.

Having considered an example environment, consider now a discussion of some example details of techniques for synchronization of DOM element references in accordance with one or more implementations.

Synchronization of DOM Element References Implementation Details

Figure 2:
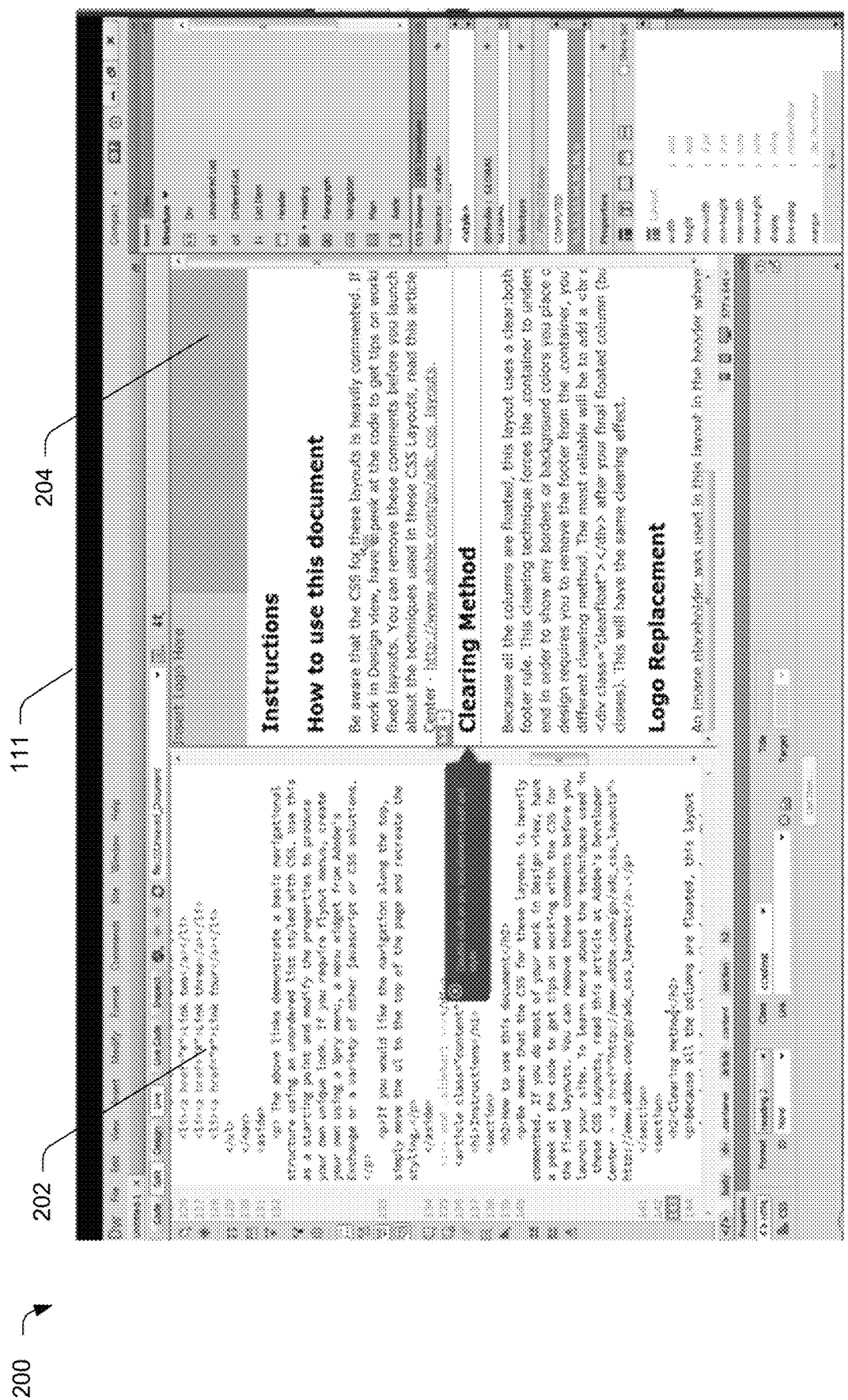
FIG. 2 illustrates an example user interface in accordance with one or more implementations.

This section describes some example details of synchronization of DOM element references in accordance with one or more implementations. In particular, FIG. 2 depicts generally at 200 an example representation of a user interface 111 that may be employed for the techniques described herein. In this example, the user interface 111 is configured to enable editing of a mark-up language document or page using various tools associated with a page editor module 110 accessible via the user interface. A split view is illustrated which includes both a structure view 202 and a rendered view 204 of a page. The split view may be configured to simultaneously display the structure view 202 and the rendered view 204 and to reflect edits made via the user interface 111 substantially in real time across both the structure view 202 and the rendered view 204. Naturally, the structure view 202 and the rendered view 204 may also be provided via different windows and in separate user interfaces associated with different applications or processes. For example, the rendered view 204 may be constructed using a browser or other client application module 108 that is external to the page editor module 110. As mentioned, the structure view 202 and rendered view 204 may be associated with different respective processes.

In any event, edits may be made visually via the rendered view 204 (e.g., design view) as well as by direct coding within the hierarchal representation presented in the structure view 202. Edits made in one view are populated to the other view and vice versa. The updates to the different views may occur substantially in real-time, such that a viewer observes little or no noticeable delay between edits made via one view and rendering of changes in the other view(s). As noted, in one or more implementations, the hierarchal representation is configured as a DOM structure view 202 for a web development page or project, although other representations are also contemplated. Element references/identifiers are also synchronized between the views as the editing occurs in the manner described herein. Accordingly, elements added or modified during one editing sequence may be available for further editing in another editing sequence quickly (e.g., substantially in "real-time" as the edits are input/received) and the editing process is not interrupted for tree comparisons or other element-by-element mapping operations.

Figure 3:
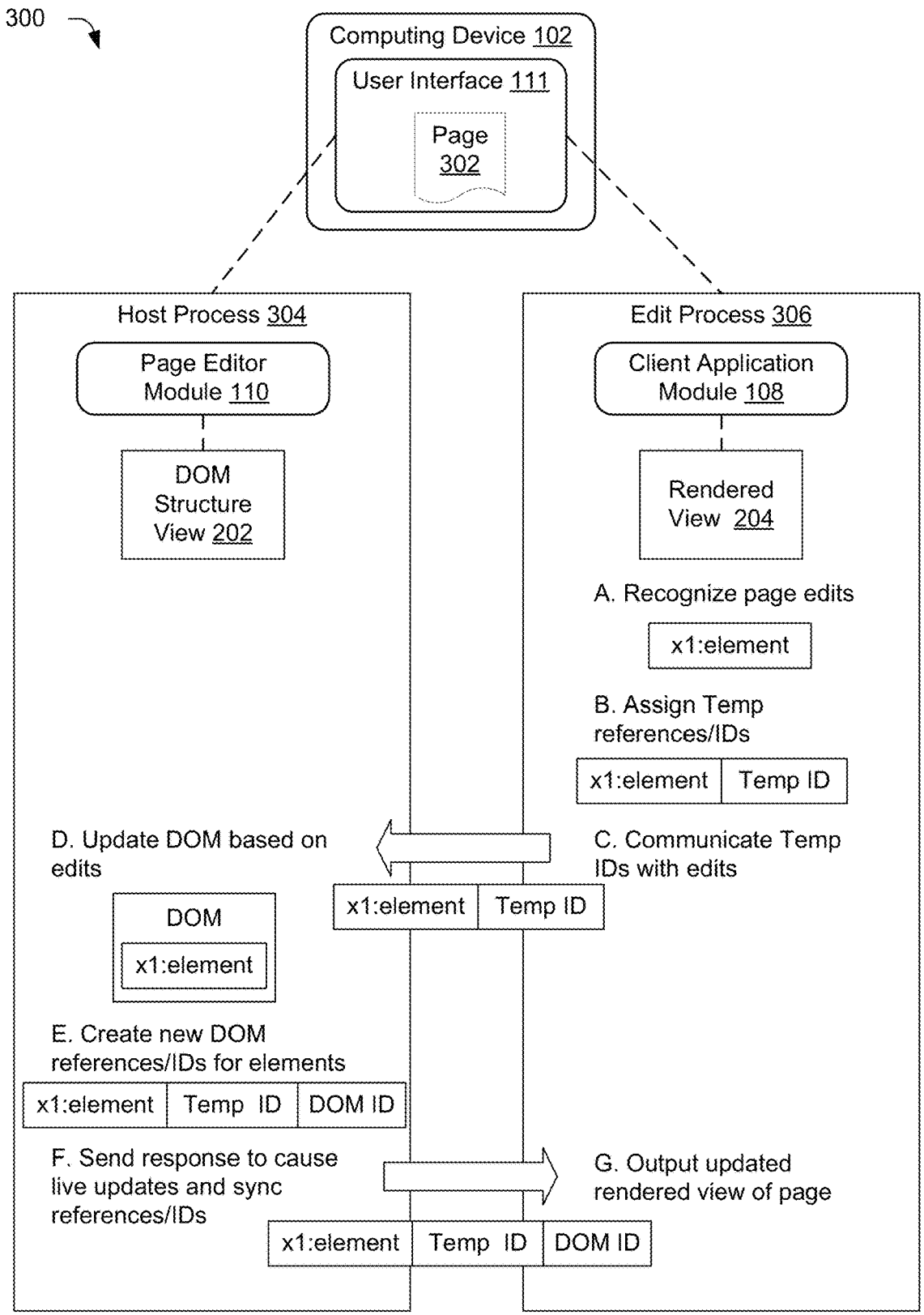
FIG. 3 illustrates another example reference synchronization scenario in accordance with one or more implementations.

To further illustrate, FIG. 3 depicts generally at 300 an example representation of a scenario in which temporary IDs are employed to facilitate synchronization of elements between processes. Here, different letters "A" to "G" are used to denote representative operations that may occur as part of the scenario. As represented, a computing device may output a user interface configured to provide interaction to view, develop, and edit a page 302, such as a webpage or other mark-up language document. For example, a user interface 111 associated with a page editor module 110 or client application module as discussed in relation to FIG. 2 may be provided via the computing device. The user interface 111 may be configured to provide access to different views of the page via different respective processes, portions of the interface, windows, etc. By way of example, FIG. 3 depicts a host process 304 instantiated via the user interface that may be configured to implement functionality of the page editor module 110 and a corresponding DOM structure view 202. Naturally, the host process 304 may also correspond to a page editor service 120 available over a network 114 from a service provider 112. FIG. 3 additionally depicts an edit process 306 instantiated via the user interface that may be configured to implement functionality of a client application module 108 (such as a browser) and a corresponding rendered view 204. In this context, the representative operations "A" to "G" include acts performed by and interaction between the host process 304 and the edit process 306 during an editing sequence in accordance with techniques discussed above and below.

In particular, editing of the page 302 may occur via the user interface 111, which as illustrated may involve editing via one or both of a host process 304 and edit process 306. In the illustrated example, page edits may be recognized through interaction with a rendered view 204 associated with application module 108 and corresponding edit process 306 as represented by operation "A". Interaction may occur in a design mode in which a user may visually create and modify the page. This may involve selection of the elements, drag and drop layout of elements, repositioning of elements, setting element properties (e.g., color, font, size, behaviors, effects, animations), and other editing operations performed via the rendered view. An example edit "X1" is illustrated as being applied to an element. User input to effectuate the edits may occur and be recognized using any suitable techniques examples of which include touch input via a touch interface, input via devices such as a mouse, keyboard, or stylus, using gestures and voice commands, and so forth. Edits may result in modifications including addition of new elements, deletion of elements changes to properties of elements, change to the arrangement of elements and so forth. These and other modifications may result in changes to sub-trees of an underlying mark-up language document for the page (e.g., the page DOM) and the element references for the page. In order to reconcile the element changes between the design view and underlying mark-up language documents, interaction may occur between the host process and the edit process.

In accordance with inventive techniques described herein, synchronization of changes may involve using temporary IDs. The temporary IDs may be associated with elements that are affected by edits to the page and may be conveyed along with indications of the edits to the host process to update the page definition (e.g., the DOM structure and other documents defining the page). Temporary IDs may be used for identification of at least the affected elements that are associated with modifications that result in changes to sub-trees of an underlying mark-up language document for the page. Temporary IDs may be configured in any suitable way. For instance, the temporary IDs may be configured as unique alphanumeric values, names, codes, links, tags, or other suitable references. The IDs may be set using a pre-defined sequential list of values (e.g., sequential element numbers), as random values, and so forth. In one example, associating temporary IDs with affected elements involves setting values of properties tags corresponding to the elements to reflect the temp IDs. In another approach, the temporary IDs may be recorded in a manifest of edits produced via the edit process 306 responsive to the edits and may then be communicated to the host process 304 to notify the page editor module regarding the changes.

Thus, as represented in FIG. 3 by operation "B", the edit process 306 may assign temporary IDs or other references to affected elements responsive to recognition of the edits. A representative "Temp ID" is shown as being associated with the edit X1. The temporary IDs are communicated to the host process 304 along with indications of the edits as represented by operation "C". For instance, data communicating the edits may be streamed between the processes substantially in real time as the edits occur. Thus, the communication may involve element-by-element notifications that indicate changes to the elements and include the temporary IDs as references. In another approach, information regarding an editing sequence that affects a collection of one or more elements may be recorded in an edit manifest over a defined time interval and the information may be communicated together for multiple elements when the particular editing sequence concludes. Conclusion of an individual editing sequence may be triggered automatically after the defined time interval, in response to explicit initiation of an update operation, based on a designated period of inactivity, and so forth. The element-by-element notifications and edit manifest are configured to enable the host process to identify elements that are modified and added. The notifications and edit manifest may reflect established identifiers or an element mapping structure for identification of existing elements that remain unchanged or that do not change positions with respect to underlying HTML structure and sub-trees of the page. As noted Temp IDs may be assigned to at least affected elements associated with modifications that result in changes to sub-trees of an underlying mark-up language document for the page.

In the host process 304, the DOM structure and other documents defining the page (e.g., script files, style documents, etc.) are updated to reflect the edits indicated by the edit process 306 as represented at operation "D". This updating may include creating new DOM IDs or other references for affected elements at operation "E". For example, a "DOM ID" may be associated with the element created or modified by edit X1 and the corresponding Temp ID. In particular, the host process 304 may utilize temporary IDs that are assigned by the edit process in various ways to create IDs with respect to the DOM structure for corresponding elements. In one approach, the host process 304 is configured to adopt the temporary IDs as DOM IDs utilized within the DOM structure. Alternatively, different newly created IDs are used that conform to formats and reference sequences associated with the DOM structure. In this case, the temporary IDs are used to notify the host process which elements have been added or modified, and appropriate new DOM IDs are created for these affected elements accordingly. Here, the edit process and host process may have different identification systems for elements and thus identifiers assigned to elements in the context of the edit process may differ from identifiers assigned to elements in the context of the host process However, the techniques discussed above and below enable synchronization of identifiers between different identification systems of the different processes using data that maps identifiers used for the same elements in the different processes, one to another. For instance, DOM IDs created in the host process may be mapped to the temporary IDs.

For example, properties corresponding to the elements may be configured to include fields for both the temporary IDs assigned by the edit process and the DOM IDs created by the host process. In this example, creating DOM IDs for elements corresponding to the temp IDs involves producing new DOM IDs in the DOM structure that are matched to the temp IDs using properties of the elements. In addition or alternatively, an ID matching data structure may be constructed to convey a mapping of the IDs between the processes, such as a mapping table, file, or manifest.

In any event, host process 302, after updating the DOM and creating appropriate IDs, sends a response at operation "F" that includes data sufficient to cause the edit process to render live updates and synchronizes the IDs used for elements. In other words, the response is configured to synchronize identifiers used by the host process and the edit process. In general, the response may be configured to contain property values, an ID mapping table, or other information sufficient to enable the client application module to associate the new DOM IDs with elements in the page to which the temp IDs were assigned when the edits occurred. For example, a string or data structure mapping the element associated with edit X1 to the DOM ID and the Temp ID may be communicated back to the edit process as represented in FIG. 3. Thus, the Temp IDs may be used as a mechanism to "synchronize" different IDs for elements that are employed in the host process and edit process. In particular, synchronization as used herein involves mapping the temp IDs created in an edit process to IDs used for the DOM structure in the host process. A string, mapping file, table, or other suitable data structure indicative of the identifier mapping may then be returned for use by the edit process. The edit process may then synchronize IDs by adopting the same IDs as used in the DOM structure or alternatively by using the mapping as a reference to ensure that elements are correctly referenced between the processes and operations are applied to elements as intended.

Subsequently, at operation "G", the client application module/edit process may output an updated rendered view of the page, which reflects the updates and references elements using IDs that are recognizable in both the edit process and host process. The operations to effectuate the reference and edit synchronization as just described occur quickly, substantially as the edits occur, such that there is little or no delay between making the edits, updating the DOM, and output of the updated rendered view that would be observable by a typical viewer. Additionally, as the IDs are synchronized by these operations, the page is available "right away" for subsequent editing. Accordingly, affected elements added or modified during one editing sequence may be available for further editing in another editing sequence quickly (e.g., substantially in "real-time" as the edits are input/received). By using the described techniques, the editing process does not have to be interrupted for tree comparisons or other element-by-element mapping operations that may create a disjointed editing experience.

Having discussed example details of the techniques for synchronizing element references, consider now some example procedures to illustrate additional aspects of the described techniques.

Example Procedures

This section describes example procedures in accordance with one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that includes or makes use of a page editor module 110 or a client application module 108. Aspects of the procedures may also be performed via a web applications 118 or a page editor service 120 available from a service provider 112 over a network.

Figure 4:
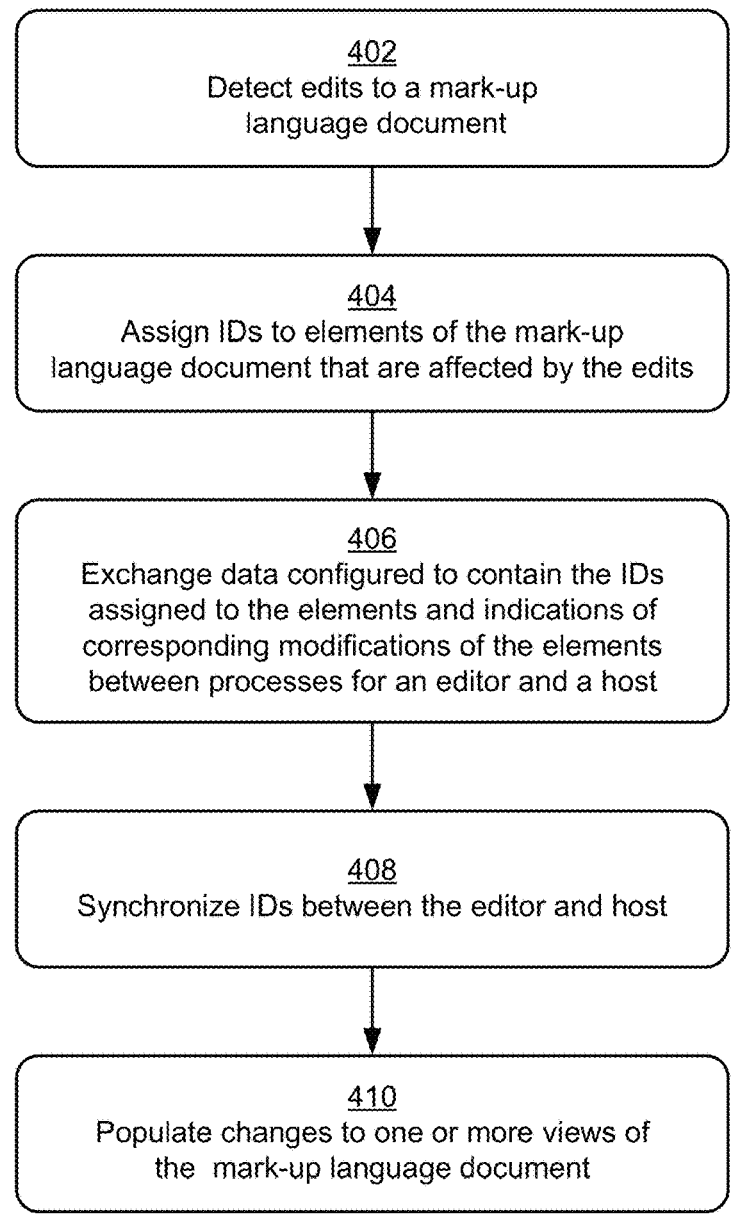
FIG. 4 is a flow diagram depicting an example procedure for rendering and storing an annotation for an object in accordance with one or more implementations.

FIG. 4 is a flow diagram depicting an example procedure 400 for element reference synchronization in accordance with one or more implementations. Edits to a mark-up language document are detected (block 402). For example, a user interface 111 may be utilized to perform editing of a web page or other mark-up language document as discussed previously. The user interface 111 may provide a split view as represented in FIG. 2. Alternatively, a rendered view and structure view may be accessible via separate windows, by toggling back and forth, using separate applications, or otherwise. In any event, editing may occur via either or both of the rendered view or structure view. The rendered view though provides a mechanism to implement visual-based editing as described previously. The rendered view may correspond to a client application module 108 such as a browser. The structure view may be implemented by a page editor module 110, such as Adobe™ Dreamweaver™ or another suitable web development suite that provides functionality for creation and editing of web development projects and corresponding web pages. As noted, a rendered view and structure view may be implemented respectively via an edit process and a host process that are separate and distinct from one another. Changes made via the rendered view (e.g., edit process) may be reflected in the structure view (e.g., host process), and vice versa.

In order to do so, identifiers are assigned to elements of the mark-up language document that are affected by the edits (block 404). The identifiers may be temporary IDs as discussed previously or other suitable references to elements that are affected by the edits. Affected elements may be elements associated with modifications that result in changes to the structure and sub-trees of an underlying mark-up language document for the page.

Identifiers may be assigned "on-demand" as edits are being performed to a document. Then, data configured to contain the identifiers assigned to the elements and indications of corresponding modifications of the elements is exchanged between processes for an editor and host (block 406) and the identifiers are synchronized between the editor and the host (block 408). For example, edits may be streamed between an edit 306 process and a host process 304 in various ways. The data is configured to use the temporary IDs or other references to associated edits with corresponding elements. This may involve setting property fields of the elements to include the identifiers. On the host process side, the DOM structure and other documents are updated in accordance with the edit indications and identifiers in the host space (e.g., DOM IDs) are created for affected elements. Then, changes are populated to one or more view of the mark-up language document (block 410). For example, the structure view of the host process and the rendered view of the edit process may be updated to show the changes substantially at the same time. Moreover, elements in both spaces have properties that include, indicate, map to, or otherwise associate the elements with DOM IDs, which can therefore be used as references in response to further editing of the elements. Thus, the DOM IDs may be used to reference subsequent edits of the elements unless the edits result in modifications that add new elements and change the sub-tree structure (e.g., the modifications produce affected elements), in which case temporary IDs may again be assigned and used for synchronization according to the described techniques.

Figure 5:
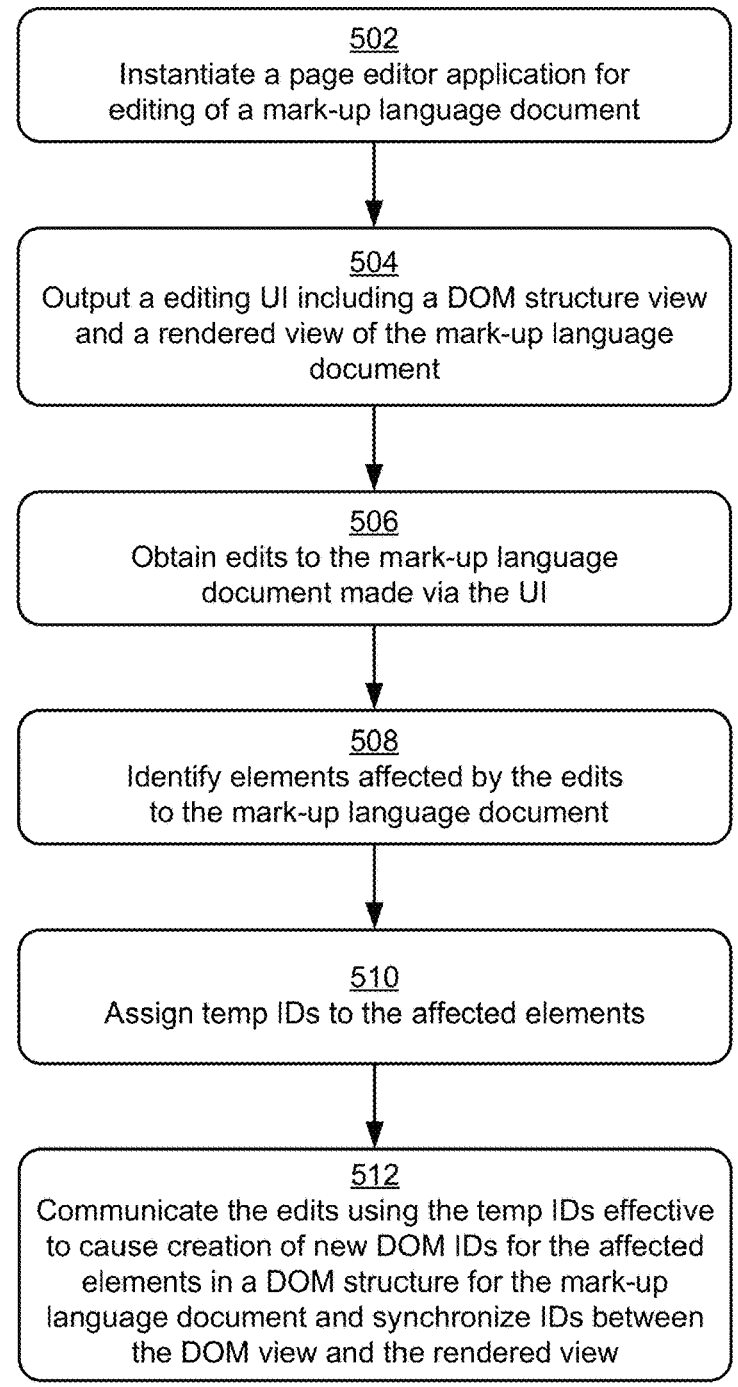
FIG. 5 is a flow diagram depicting an example procedure for selection of an annotation shape based on an input pattern in accordance with one or more implementations.

FIG. 5 is a flow diagram depicting an example procedure 500 for editing of a mark-up language document with reference synchronization in accordance with one or more implementations. A page editor application is instantiated for editing of a mark-up language document (block 502). For example, a processing system of a computing device may execute a page editor application 110. Alternatively, the computing device may be employed to access a page editor service 120 over a network. The mark-up language document may be configured as a web page associated with a web development project or other document associated with a project.

An editing user interface is output that includes a DOM structure view and a rendered view of the mark-up language document (block 504). The editing user interface may be configured in various ways, one example of which is the user interface 111 of FIG. 2, which provides a split view having the a structure view and a rendered view. In one or more implementations, the structure view and the rendered view are implemented using separate and distinct processes.

Thereafter, edits made to the mark-up language document via the UI are obtained (block 506) and elements affected by the edits to the mark-up language document are identified (block 508). In one approach, the edits are obtained via the rendered view. The rendered view may be implemented by a third-party browser extension for the page editor or as an integrated component of the page editor. Generally speaking, the edits involve changes to properties of elements and addition of elements corresponding to user interaction with the elements through the rendered view. Naturally, edits may also be made by coding via the structure view (e.g., editing the DOM for a page directly).

Temporary identifiers are assigned to the affected elements (block 510). This may occur in various way. In one example, values of properties tags corresponding to the affected elements are set to reflect the temp IDs. Temp IDs may be sequential numbers, element names, randomly generated unique values, or other suitable references. Generally the affected elements may include new elements that are added and removed elements, as well as elements that are modified in a manner that necessitates association with new IDs. Further, the edits may result in changes to at least one sub-tree of the DOM structure for the mark-up language document, which will prompt creation of new identifiers. For example, layout changes and extensive properties changes may cause sub-tree changes in the edit process that make previous references to elements no longer viable for proper inter-process synchronization. In the case of removed elements, the removal may cause a re-sequencing of remaining elements within a corresponding sub-tree that initiates a corresponding identifier update.

Then, the edits are communicated using the temp IDs effective to cause creation of new DOM IDs for the affected elements in a DOM structure for the mark-up language document and synchronize IDs between the DOM view and the rendered view (block 512). For example, an edit process may stream information regarding edits to a host process substantially in real time as the edits occur or send information for multiple edits according to a defined time interval as described previously. Likewise, the host process may communicate information regarding updated page structure back to the edit process, such that edits made in one view are populated to the other view, and vice versa. On the host side, appropriate DOM IDs may be created in response to information describing edits that is obtained from the edit process. The DOM IDs may be created using the temp IDs contained in communications regarding the edits as previously noted. In this way, element references/identifiers may be synchronized between the views quickly (e.g., substantially in "real-time" as the edits are input/received) without using disruptive tree comparisons or other element-by-element mapping analysis.

Having described example procedures in accordance with one or more implementations, consider now a discussion of example systems and devices that can be utilized to implement the various techniques described herein.

Example System and Device

Figure 6:
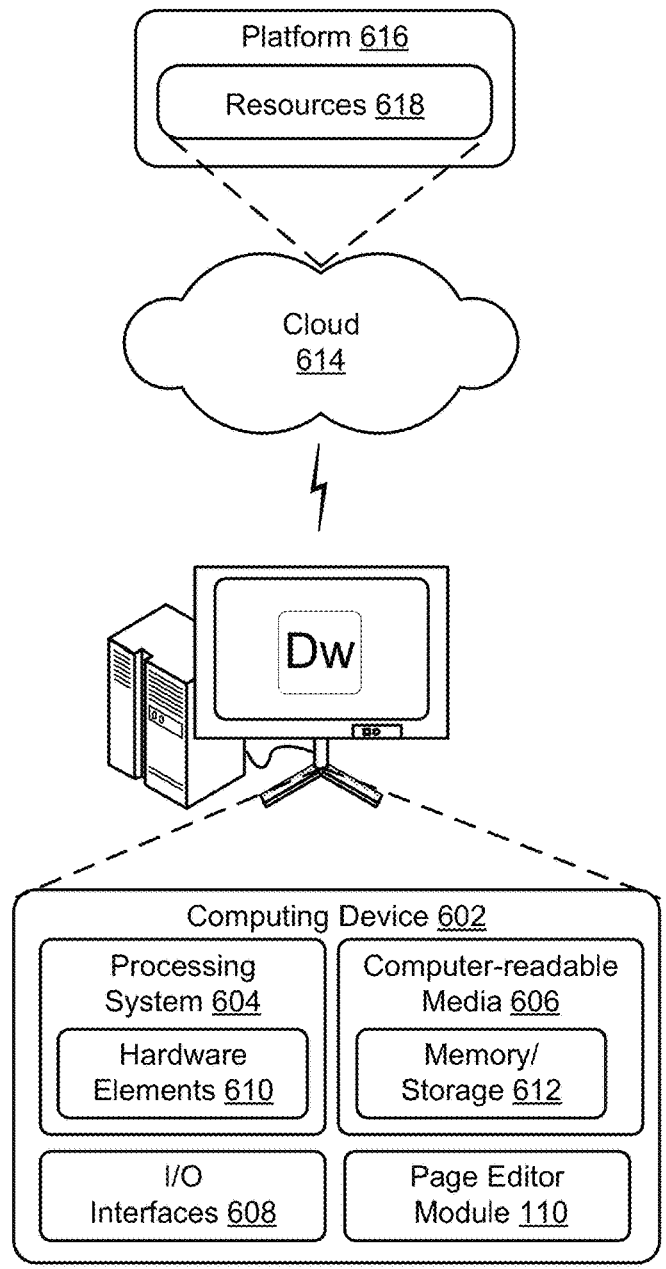
FIG. 6 illustrates an example system including various components of an example device that can be employed for one or more implementations described herein.

FIG. 6 illustrates an example system generally at 600 that includes an example computing device 602 that is representative of one or more computing systems or devices that may implement the various techniques described herein. This is illustrated through inclusion of the page editor module 110, which operates as described above. The computing device 602 may be, for example, a server of a service provider, a device associated with a client (e.g., a client device), an on-chip system, and any other suitable computing device or computing system.

The example computing device 602 is illustrated as including a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and devices that enable persistent and non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and logic embodied on some form of computer-readable storage media or by one or more hardware elements 610. The computing device 602 may be configured to implement particular instructions and functions corresponding to the software and hardware modules. Accordingly, implementation of a module that is executable by the computing device 602 as software may be achieved at least partially in hardware, e.g., through use of computer-readable storage media and hardware elements 610 of the processing system 604. The instructions and functions may be executable/operable by one or more articles of manufacture (for example, one or more computing devices 602 and processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes or is representative of a platform 616 for resources 618. The platform 616 abstracts underlying functionality of hardware (e.g., servers) and software resources of the cloud 614. The resources 618 may include applications and data that can be utilized while computer processing is executed on servers that are remote from the computing device 602. Resources 618 can also include services provided over the Internet as well as through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although techniques have been described in language specific to structural features and methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device, the method comprising:
  obtaining edits made to a mark-up language document via a rendered view of the mark-up language document;
  identifying elements affected by the edits to the mark-up language document;
  assigning temporary identifiers (temp IDs) to the affected elements, the temp IDs being assigned according to the edits and used as element references to map between the affected elements of the rendered view and corresponding affected elements in a document object model (DOM) structure view of the mark-up language document, the rendered view and the DOM structure view being implemented using separate and distinct processes of separate applications executing on the computing device;
  recording the temp IDs in a manifest of edits produced in response to the edits;
  communicating, to a remote hosting service, the manifest of edits using the temp IDs that are adopted as new document object model identifiers (DOM IDs) for the corresponding affected elements in the DOM structure view for the mark-up language document; and
  responsive to the communicating, receiving, from the remote hosting service, data indicative of a mapping of the temp IDs that are adopted as the new DOM IDs to enable synchronization of identifiers used for the corresponding affected elements between the DOM structure view and the rendered view.

2. The method of claim 1, wherein the mark-up language document comprises a web page associated with a web development project.

3. The method of claim 1, further comprising:
  instantiating a page editor application for editing of the mark-up language document, the page editor application corresponding to a host process of the separate and distinct processes; and
  outputting an editing user interface of a browser application corresponding to an edit process of the separate and distinct processes, the editing user interface including the document object model (DOM) structure view and the rendered view of the mark-up language document.

4. The method of claim 3, wherein the edits comprise changes to properties of the affected elements and addition of new elements corresponding to user interaction with the affected elements and the new elements through the rendered view.

5. The method of claim 3, wherein the rendered view is implemented by a browser extension for the page editor application.

6. The method of claim 3, wherein rendered view is implemented by the browser application integrated with the page editor application.

7. The method of claim 3, wherein the page editor application is configured as a page editor service accessible from a service provider over a network.

8. The method of claim 1, wherein the document object model (DOM) structure view is implemented using a host process that corresponds to a page editor application, and the rendered view is implemented using an edit process that corresponds to a browser application, the host process and the edit process being the separate and distinct processes of the separate applications.

9. The method of claim 1, wherein the edits cause changes to at least one sub-tree of the DOM structure view for the mark-up language document for which the new DOM IDs are created.

10. The method of claim 1, wherein synchronization of the temp IDs used for the corresponding affected elements between the DOM structure view and the affected elements of the rendered view comprises setting properties of the affected elements in the rendered view to associate the corresponding affected elements with the new DOM IDs created in the DOM structure view.

11. The method of claim 1, wherein assigning the temp IDs comprises setting values of properties tags corresponding to the affected elements to reflect the temp IDs.

12. The method of claim 1, further comprising:
  populating the edits made to the mark-up language document to the document object model (DOM) structure view and the rendered view.

13. One or more hardware computer-readable storage media comprising stored instructions that are executable and, responsive to execution by a computing device, cause the computing device to execute a page editor module in a host process to perform operations including:
  receiving, from a remote device, indications of edits to a page made via a client application module executed in an edit process on the remote device, the indications containing temporary identifiers (temp IDs) assigned by the client application module to elements of the page according to the edits, the temp IDs being recorded in a manifest of edits produced in response to the edits, and the temp IDs being used as element references to map between the elements of the edit process and corresponding elements in a document object model (DOM) for the page of the host process, the edit process and the host process implemented using separate and distinct processes of separate applications executing on the remote device and the computing device, respectively;
  updating the corresponding elements of the DOM for the page to reflect the indications of the edits to the elements of the page by the edit process;
  adopting the temp IDs as new document object model identifiers (DOM IDs) for the corresponding elements of the DOM for the page, the temp IDs for the corresponding elements of the DOM for the page corresponding to the temp IDs from the manifest of edits assigned by the client application module; and
  sending a response to the remote device to cause live updates to a rendered view of the page exposed via the client application module and communicate the DOM IDs that are adopted from the temp IDs for use by the client application module.

14. One or more hardware computer-readable storage media as described in claim 13, wherein the response is configured to synchronize the temp IDs used by the host process and the edit process.

15. One or more hardware computer-readable storage media as described in claim 13, wherein the client application module comprises a browser application corresponding to the edit process, and the page editor module comprises a page editor application corresponding to the host process.

16. One or more hardware computer-readable storage media as described in claim 13, wherein the adopting the temp IDs as the new DOM IDs for the corresponding elements of the DOM for the page comprises producing the new DOM IDs in the DOM that are matched to the temp IDs using properties of the elements, such that the response contains information sufficient to enable the client application module to associate the new DOM IDs with the corresponding elements in the DOM for the page to which the temp IDs are assigned according to the edits.

17. A computing device comprising:
a processing system;
one or more computer-readable media storing instructions that, responsive to execution by the processing system, cause the computing device to execute a client application module in an edit process to perform operations including:
rendering a page for editing via a rendered view;
recognizing edits made to the page via the rendered view;
assigning temporary identifiers (temp IDs) to one or more elements of the page associated with the edits, the temp IDs being used as element references to map between the one or more elements of the page edited with the edit process and corresponding elements of a document object model (DOM) structure for the page of a host process, the host process and the edit process being implemented as separate and distinct processes of separate applications executing on the computing device;
recording the temp IDs in a manifest of edits produced in response to the edits; and
communicating the manifest of edits along with the temp IDs to a page editor module executed in the host process to facilitate updating of the corresponding elements of the DOM structure for the page associated with the page editor module in a hierarchal representation of the page, the host process executed by the page editor module to map the temp IDs assigned during the edit process, and the temp IDs adopted as new document object model identifiers (DOM IDs) for the corresponding elements of the DOM structure for the page of the host process.

18. The computing device as described in claim 17, wherein the edits are effective to cause the page editor module to:
update the hierarchal representation of the page according to the edits;
send a response containing the new DOM IDs to the client application module to cause the client application module to perform further operations including:
matching the one or more elements of the page to the new DOM IDs; and
updating the rendered view to reflect the edits.

19. The computing device as described in claim 18, wherein the hierarchal representation of the page comprises the DOM structure for the page in accordance with the host process.

20. The computing device as described in claim 19, wherein the host process is configured to host the edit process and output an editing user interface having a split view to simultaneously display the rendered view and the document object model (DOM) structure for the page.

\* \* \* \* \*